United States Patent
Lee et al.

(10) Patent No.: US 12,491,426 B2
(45) Date of Patent: Dec. 9, 2025

(54) APPARATUS FOR PROVIDING TERRAIN INFORMATION ON GREEN AND METHOD FOR PROVIDING TERRAIN INFORMATION ON GREEN

(71) Applicant: GOLFZON CO., LTD., Seoul (KR)

(72) Inventors: Kyung-yong Lee, Seoul (KR); Bong-ho Song, Seoul (KR); Jin-hyung Choi, Seoul (KR); Dae-Jun Hong, Seoul (KR)

(73) Assignee: GOLFZON Co., Ltd., Seoul (KR)

( * ) Notice: Subject to any disclaimer, the term of this patent is extended or adjusted under 35 U.S.C. 154(b) by 385 days.

(21) Appl. No.: 18/179,705

(22) Filed: Mar. 7, 2023

(65) Prior Publication Data

US 2023/0201697 A1    Jun. 29, 2023

Related U.S. Application Data

(63) Continuation of application No. PCT/KR2021/008368, filed on Jul. 1, 2021.

(30) Foreign Application Priority Data

Sep. 9, 2020   (KR) .................. 10-2020-0115608

(51) Int. Cl.
    *A63B 69/36*    (2006.01)
    *A63B 24/00*    (2006.01)
    *A63B 71/06*    (2006.01)

(52) U.S. Cl.
    CPC ...... *A63B 71/0622* (2013.01); *A63B 24/0021* (2013.01); *A63B 69/3676* (2013.01);
    (Continued)

(58) Field of Classification Search
    CPC ............ A63B 71/0622; A63B 24/0021; A63B 69/3676; A63B 2024/0028;
    (Continued)

(56) References Cited

U.S. PATENT DOCUMENTS 5,303,924 A * 4/1994 Kluttz ................ A63B 69/3658
                                                        473/409
5,390,927 A * 2/1995 Angelos ................. A63B 69/36
                                                        434/252

(Continued)

FOREIGN PATENT DOCUMENTS

JP      51-142466 U    11/1976
JP      2001-120704 A   5/2001
(Continued)

OTHER PUBLICATIONS

International Search Report of PCT/KR2021/008368 dated Nov. 30, 2021 [PCT/ISA/210].

(Continued)

*Primary Examiner* — Nini F Legesse
(74) *Attorney, Agent, or Firm* — Sughrue Mion, PLLC

(57) ABSTRACT

Proposed herein are an apparatus for providing terrain information on a green and a method for providing terrain information on a green. According to one embodiment, there is proposed an apparatus for providing terrain information on a green, the apparatus including: a simulation processor configured to display a virtual golf course image regarding a green, a hole cup on the green, and a first ball; and a guide processor configured to display a guide path between the hole cup and the first ball to provide terrain information on the green.

10 Claims, 10 Drawing Sheets

(52) U.S. Cl.
CPC .............. *A63B 2024/0028* (2013.01); *A63B 2071/0638* (2013.01); *A63B 2071/0694* (2013.01); *A63B 2220/70* (2013.01)

(58) Field of Classification Search
CPC .... A63B 2071/0638; A63B 2071/0694; A63B 2220/70; A63B 2071/0647; A63B 69/36
USPC ............................... 473/156, 199, 222, 409
See application file for complete search history.

(56) References Cited

U.S. PATENT DOCUMENTS

| | | | |
|---|---|---|---|
| 5,437,466 | A | 8/1995 | Meibock et al. |
| 7,713,148 | B2 | 5/2010 | Sweeney |
| 9,314,683 | B2* | 4/2016 | Lee ................... A63B 69/3658 |
| 9,463,357 | B2* | 10/2016 | Ok ..................... A63B 24/0021 |
| 10,409,363 | B1* | 9/2019 | Kudirka ................ A63F 13/211 |
| 10,850,180 | B2* | 12/2020 | Lee ........................ A63B 69/36 |
| 11,167,203 | B2* | 11/2021 | Van Wagoner ....... A63F 7/0628 |
| 2010/0227713 | A1* | 9/2010 | Sweeney ............ A63B 69/3676 473/409 |
| 2012/0276965 | A1 | 11/2012 | Ok |
| 2013/0237346 | A1* | 9/2013 | Sweeney ............ A63B 69/3676 473/407 |
| 2014/0003666 | A1* | 1/2014 | Park ................... G09B 19/0038 382/103 |
| 2016/0306036 | A1* | 10/2016 | Johnson ................... G01S 13/86 |
| 2022/0176227 | A1* | 6/2022 | Lee ........................ A63B 67/02 |

FOREIGN PATENT DOCUMENTS

| | | |
|---|---|---|
| JP | 5722343 B2 | 5/2015 |
| JP | 5960333 B1 | 8/2016 |
| JP | 6714800 B2 | 7/2020 |
| JP | 2020-130987 A | 8/2020 |
| KR | 10-2001-0016043 A | 3/2001 |
| KR | 10-0970677 B1 | 7/2010 |
| KR | 10-0972963 B1 | 7/2010 |
| KR | 10-0992420 B1 | 11/2010 |
| KR | 10-2011-0072480 A | 6/2011 |
| KR | 10-1262362 B1 | 5/2013 |
| KR | 10-1471490 B1 | 12/2014 |
| KR | 10-1994225 B1 | 7/2019 |
| KR | 10-2148254 B1 | 8/2020 |

OTHER PUBLICATIONS

Japanese Office Action dated Jan. 14, 2025 in Application No. 2023-515729.

* cited by examiner

APPARATUS FOR PROVIDING TERRAIN INFORMATION ON GREEN AND METHOD FOR PROVIDING TERRAIN INFORMATION ON GREEN

CROSS-REFERENCE TO RELATED APPLICATIONS

The present application is a Continuation of PCT International Application No. PCT/KR2021/008368 filed on Jul. 1, 2021 claiming priority under 35 U.S.C § 119 (a) to Korean Patent Application No. 10-2020-0115608 filed on Sep. 9, 2020. Each of the above applications is hereby expressly incorporated by reference, in its entirety, into the present application.

TECHNICAL FIELD

The embodiments disclosed herein relate to an apparatus for providing terrain information on a green and a method for providing terrain information on a green, and more particularly to an apparatus and method for providing terrain information on a green on a virtual golf course.

BACKGROUND ART

Recently, the popularity of screen golf ranges has been increasing. As screen golf ranges, which are cheaper to use than actual golf courses and can be enjoyed without restrictions on time, location, and the like, have been opened within users' living areas, anyone can easily enjoy golf simulation games.

Meanwhile, as for putting performed on a green in a golf game, a user can perform putting in a more accurate direction with more accurate force only when the user accurately determines the state of the terrain from the location of a golf ball to the location of a hole cup. Accordingly, it is important to determine the state of the terrain. To this end, before a user makes a shot in an actual golf course, the user observes the terrain by matching his or her eye level with the ground at the location of a golf ball or a location near the golf ball.

However, since it is difficult for the user to actually match his or her eye level with the ground in screen golf, it is important to provide information so that the user can determine the state of the terrain.

However, currently proposed screen golf systems have limitations in providing information on terrain to users, making it difficult for users to draw up strategy. Accordingly, there is a demand for a technology that increases the fun of a golf round and improves the level of immersion in a golf game by providing an element that allows a user to draw up strategy.

In connection with this, Korean Patent No. 10-2001-0016043, which is a prior art document, proposes a golf simulation system that allows an effect, such as the effect of playing golf on an actual golf course, to be obtained indoors or in a narrow space. The system describes the use of various putting lies, but it is still difficult for a user to determine the state of terrain even through the prior art. Therefore, there is a demand for a technology for solving the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

An object of the embodiments disclosed herein is to propose an apparatus for providing terrain information on a green and a method for providing terrain information on a green.

Another object of the embodiments disclosed herein is to propose an apparatus for providing terrain information on a green and method for providing terrain information on a green that are capable of intuitively providing information about terrain to a user.

Another object of the embodiments disclosed herein is to propose an apparatus for providing terrain information on a green and method for providing terrain information on a green that are capable of displaying an afterimage when a ball moves.

Technical Solution

As a technical solution for overcoming the above-described technical problems, one embodiment described herein is directed to an apparatus and method for providing terrain information on a green on a virtual golf course.

Advantageous Effects

According to one of the above-described solutions, there may be proposed the apparatus for providing terrain information on a green and the method for providing terrain information on a green.

According to one of the above-described solutions, there may be proposed the apparatus for providing terrain information on a green and method for providing terrain information on a green that are capable of intuitively providing information about terrain to a user.

According to one of the above-described solutions, there may be proposed the apparatus for providing terrain information on a green and method for providing terrain information on a green that are capable of displaying an afterimage when a ball moves. Therefore, a user may be induced to draw up a new strategy, and accordingly, a user's immersion in a golf game may be increased.

The effects that can be obtained by the embodiments disclosed herein are not limited to the above-described effects, and other effects that have not been described above will be clearly understood by those having ordinary skill in the art, to which the present invention pertains, from the following description.

BEST MODE

Figure 1:
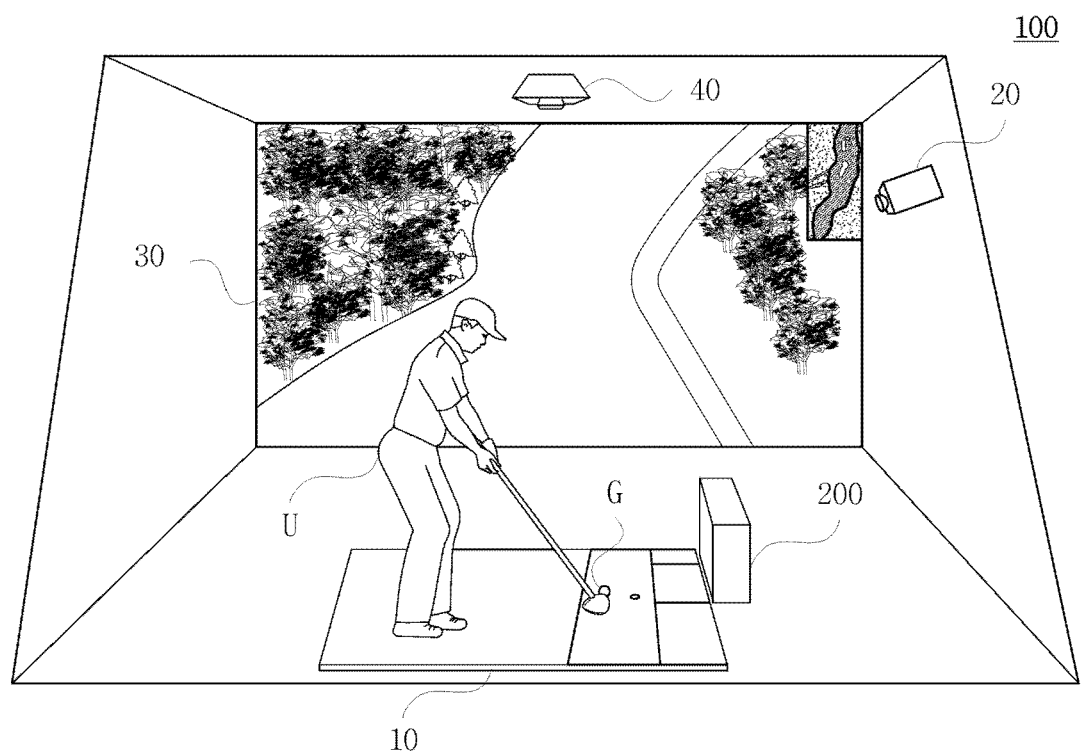
FIG. 1 is a diagram showing a screen golf system in which an apparatus for providing terrain information on a green according to an embodiment disclosed herein is implemented.

As a technical solution for overcoming the above-described technical problems, according to one embodiment described herein, there is proposed an apparatus for providing terrain information on a green, the apparatus including: a simulation processor configured to display a virtual golf course image regarding a green, a hole cup on the green, and a first ball; and a guide processor configured to display a guide path between the hole cup and the first ball to provide terrain information on the green.

Furthermore, as a technical solution for overcoming the above-described technical problems, according to one embodiment described herein, there is proposed a method for providing terrain information on a green, the method being performed by an apparatus for providing terrain information on a green the apparatus, the method including: displaying a virtual golf course image regarding a green, a hole cup on the green, and a first ball; and displaying a guide path between the hole cup and the first ball to provide terrain information on the green.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween.' Furthermore, when one portion is described as "including" one component, this does not mean that the portion does not exclude another component but means that the portion may further include another component, unless explicitly described to the contrary.

Embodiments will be described in detail below with reference to the accompanying drawings.

Figure 2:
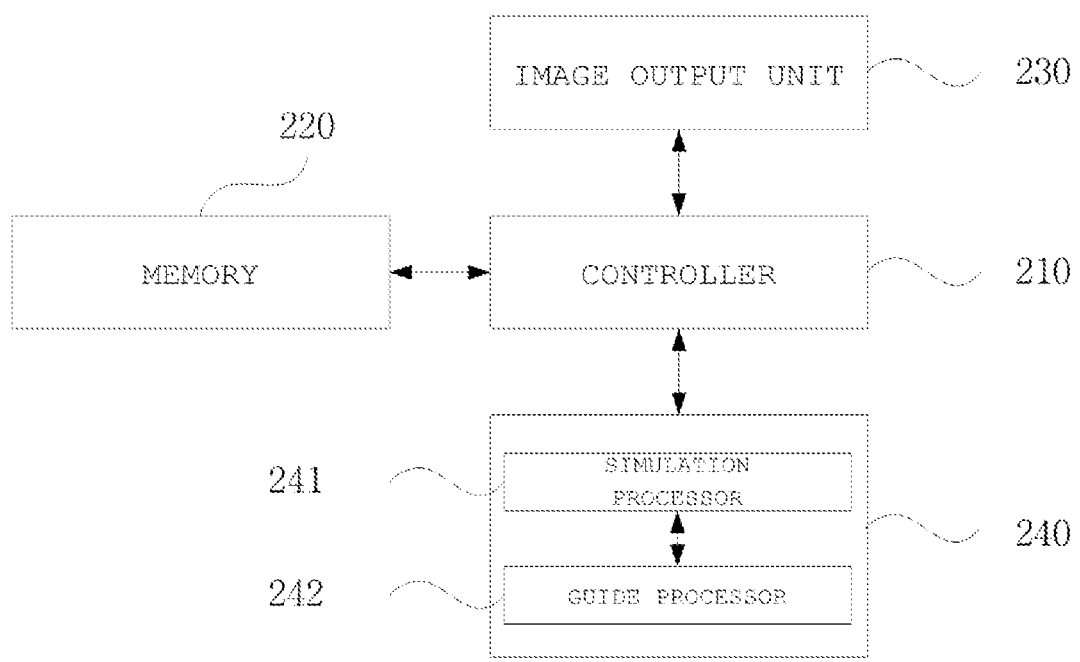
FIG. 2 is a block diagram showing the configuration of the apparatus for providing terrain information on a green according to the embodiment disclosed herein.
Figure 3:
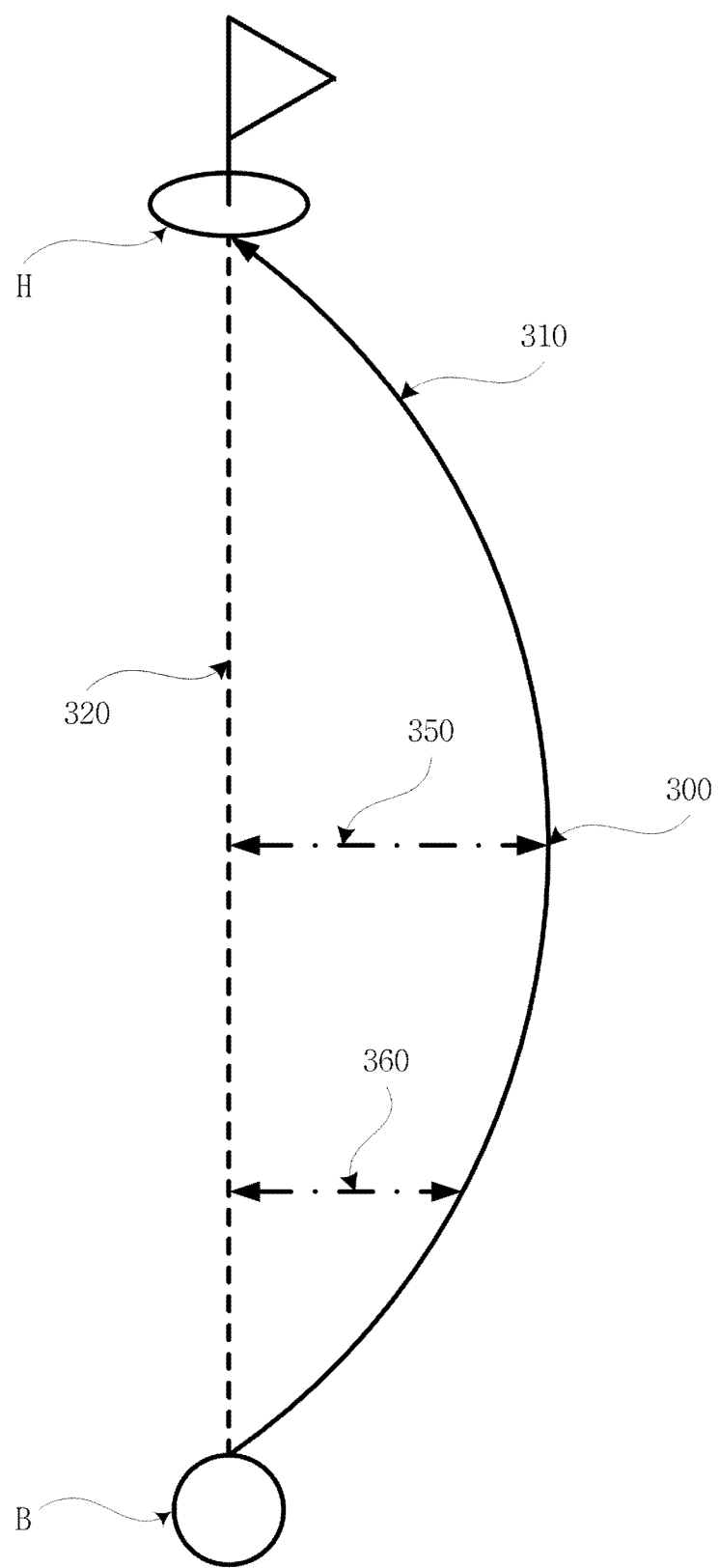
FIGS. 3 to 5 are exemplary diagrams illustrating the apparatus for providing terrain information on a green according to the embodiment disclosed herein.
Figure 4:
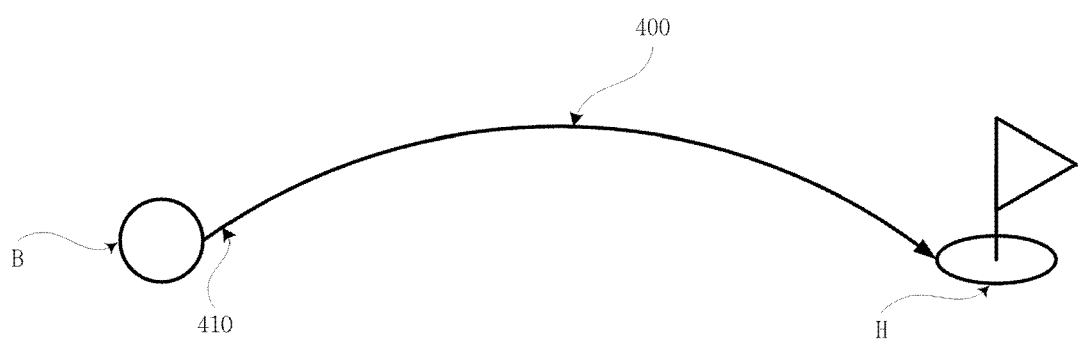
Figure 5:
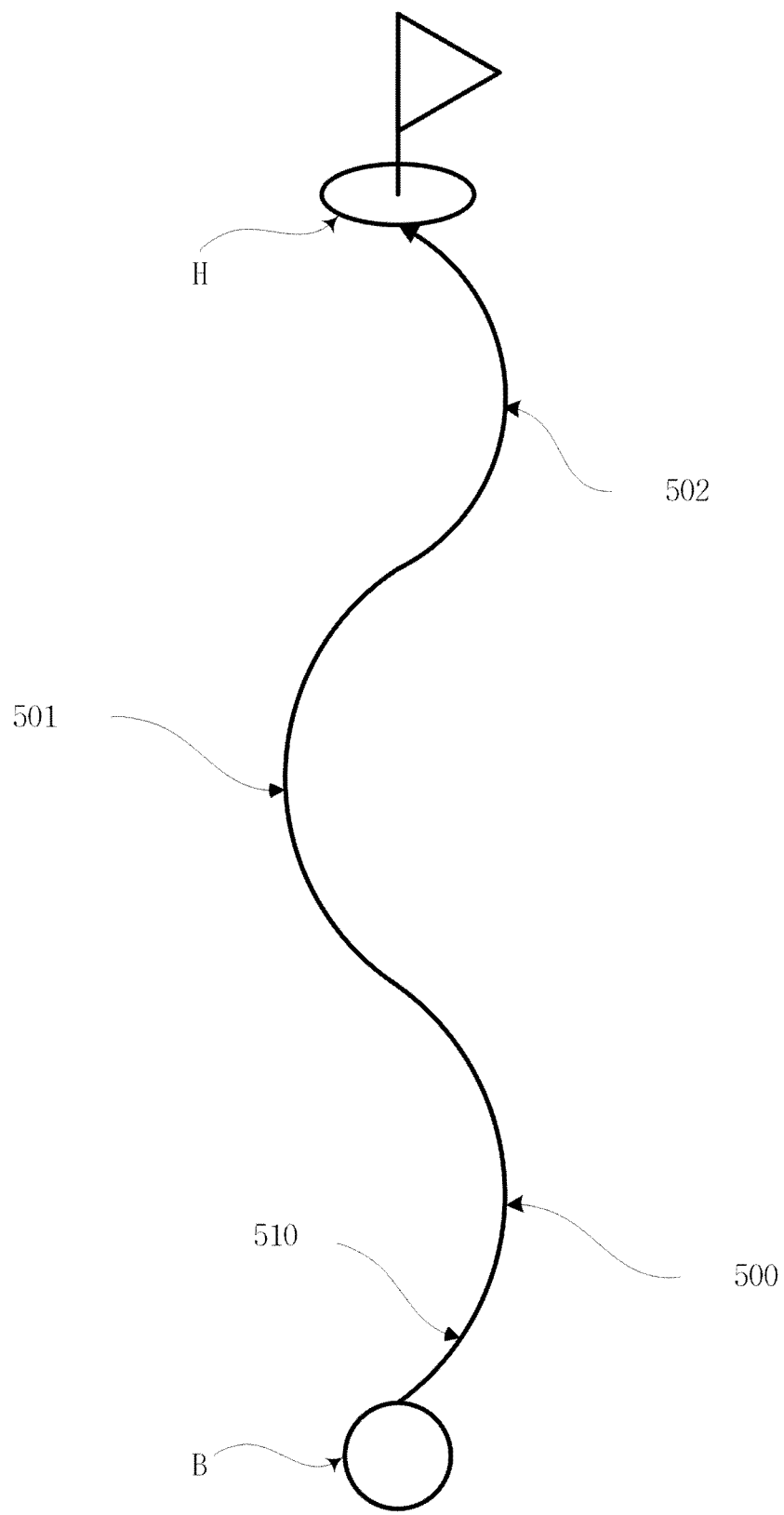

FIG. 1 is a diagram showing a screen golf system in which an apparatus for providing terrain information on a green according to an embodiment disclosed herein is implemented, FIG. 2 is a block diagram showing the configuration of the apparatus for providing terrain information on a green, and FIGS. 3 to 5 are exemplary diagrams illustrating the apparatus for providing terrain information on a green according to the embodiment disclosed herein.

As shown in FIG. 1, a screen golf system 100 according to an embodiment described herein includes a swing plate 10 configured such that a user U can hit a golf ball G thereon, a sensing device 20 configured to detect the movement of at least one of the user U, the golf ball G, and a golf club, an image output device 40 configured to output a predetermined image to a screen 30 provided on the front side, and an apparatus 200 for providing terrain information on a green configured such that all types of data required for virtual golf simulation are stored and processed therein.

The apparatus 200 for providing terrain information on a green according to the embodiment described herein stores all types of data required for virtual golf simulation, and processes all images related to virtual golf simulation, such as an image of a virtual golf course and an image of the movement of a golf ball. In addition, images processed by the apparatus 200 for providing terrain information on a green are displayed through the screen 30.

Accordingly, when the user U hits the golf ball G toward the screen 30 on the swing plate 10, the sensing device 20 may sense it and transfer it to the apparatus 200 for providing terrain information on a green, and the apparatus 200 for providing terrain information on a green may simulate a virtual ball trajectory on a virtual golf course based on the movement of at least one of the user U, the golf ball G, and the golf club. In other words, the apparatus 200 for providing terrain information on a green may construct golf simulation image information, such as an image of the movement of a ball on a virtual golf course, by taking into consideration the characteristics of the movement of an actual golf ball, and may project the golf simulation image information onto the screen 30 through the image output device 40 implemented as a projector or the like, thereby allowing a golf game to be played through simulation.

In addition, the apparatus 200 for providing terrain information on a green operates to process all complicated manipulations for virtual golf simulation. For example, the apparatus 200 for providing terrain information on a green may allow a user to log in for virtual golf simulation or to manipulate a simulation environment in response to the acquisition of a manipulation command. Accordingly, the apparatus 200 for providing terrain information on a green may receive, for example, break point display settings from a user, and may receive input at the beginning of a round or in the middle of a round.

Meanwhile, the sensing device 20 according to an embodiment is a device that acquires an image of a situation in which the golf ball G is hit by the golf club in a hitting area while monitoring the hitting area, i.e., a predetermined area where the golf ball G is placed and hit by the golf club in the swing plate 10, and senses the movement of at least one of the user U, the golf ball G, and the golf club from the image.

The sensing device 20 may be provided as an imaging device such as a vision sensor that takes an image of the hitting area. In connection with this, although the sensing device 20 is shown as being installed on a wall of the screen golf system in FIG. 1, the sensing device 20 may be implemented as a sensor installed on the ceiling of the screen golf system and a sensor installed on a side wall of the screen golf system. Alternatively, the sensing device 20 may be implemented on the apparatus 200 for providing terrain information on a green. For example, when the sensing device 20 is implemented as two vision sensors, the two vision sensors may monitor the hitting area in an overlapping manner. This is an example, but the sensing device 20 is not necessarily limited to this and includes cases in which two or more vision sensors are installed. The location where the vision sensor is installed may include all cases where the vision sensor is installed anywhere in the booth of the screen golf system as well as cases where the vision sensor is installed on the ceiling or a wall.

As the sensing device 20 detects the movement of at least one of the user, the golf ball and the golf club, the sensing device 20 calculates sensing information such as movement parameters for the movement of the golf ball, and transfers the sensing information to the apparatus 200 for providing terrain information on a green. The apparatus 200 for providing terrain information on a green may calculate shot data from the sensing information.

Although the apparatus 200 for providing terrain information on a green according to the embodiment described herein has been described as being applied to the screen golf system 100 in detail, the application thereof is not necessarily limited to the screen golf system 100, but it may be applied to all types of systems or devices in which a virtual golf course is simulated and visualized and an image of the movement of a virtual ball thereon is simulated. Meanwhile, as shown in FIG. 2, the apparatus 200 for providing terrain information on a green may include a controller 210, a memory 220, an image output unit 230, and an image processor 240.

The controller 210 may control the overall operation of the apparatus 200 for providing terrain information on a green, and may include a processor such as a CPU or the like.

For example, the controller 210 may execute a program stored in the memory 220, may read a file stored in the memory 220, or may store a new file in the memory 220.

In contrast, various types of data such as files, applications, and programs may be installed and stored in the memory 220. For example, a program for performing a method for providing terrain information on a green may be installed in the memory 220. Accordingly, the controller 210 may perform a method for providing terrain information on a green by executing the program stored in the memory 220.

The memory 220 stores all types of data required to implement images of virtual golf simulation. For example, the memory 220 may store data related to a virtual golf course implemented by visualizing an actual golf course.

For example, the memory 220 may store information about the terrain of a green on a virtual golf course or information about the location of a hole cup on the green.

To this end, the memory 220 may be configured to receive various types of data related to a virtual golf course from a server (not shown) over a network and to temporarily store them.

Furthermore, the memory 220 may be configured to receive sensing information such as movement parameters related to the movement of a golf ball from the sensing device 20 and to temporarily store it.

Meanwhile, the image output unit 230 projects a simulation image, processed by the image processor 240, onto the screen 30 through the image output device 40 so that a user can view the image.

In this case, the image processor 240 may perform information processing to implement an image related to a virtual golf course by using data related to the virtual golf course stored in the memory 220, and may simulate and implement the ball trajectory of the golf ball G, hit by the user, on the virtual golf course as an image.

The image processor 240 may include a simulation processor 241 and a guide processor 242.

The simulation processor 241 may visualize the environment of a golf course and provide an image thereof, and may also calculate the trajectory of a ball on a virtual golf course.

In this case, the 'trajectory' refers to a result obtained by simulating the movement of a ball on a virtual golf course as a user hits the golf ball. The trajectory is represented by a form in which the ball moves on the virtual golf course, by a form obtained by connecting the traces of the movement of the ball on the virtual golf course with lines, or by text, image, voice, or video indicative of a driving distance value.

For example, the simulation processor 241 may process simulation according to shot data. The shot data may be calculated from the sensing information by the simulation processor 241. The shot data may include ball speed, direction angle, launch angle, backspin, sidespin, carry, and driving distance.

Furthermore, the simulation processor 241 may simulate environment data and shot data together during the simulation of the trajectory according to a user's golf shot while visualizing the environment of a golf course according to the environment data and providing it. In this case, the environment data represents the environment of a virtual golf course where the user performed the golf shot, and may include, e.g., the terrain, season, weather, temperature, humidity, wind speed, and wind direction of the virtual golf course.

Accordingly, for example, the simulation processor 241 may provide virtual golf simulation images of a green on a virtual golf course and a hole cup on the green, and may, when a user makes a golf shot toward the hole cup on the green, visualize the trajectory of a ball toward the hole cup and project the visualized trajectory onto the screen 30 through the image output unit 230.

Meanwhile, the guide processor 242 may provide terrain information on a green, and may provide a guide path between a hole cup and a ball for this purpose.

In other words, terrain information such as lie, slope, and green speed may vary depending on each green, and the guide processor 242 may provide terrain information on a green by providing a guide path.

In this case, the term 'guide path' refers to an optimal path for a hole-in based on terrain information on an area between the location where a ball is placed and a hole cup when the ball is hit on a virtual golf course. The guide path is the path along which a ball is moved by putting. The guide path may extend to the hole cup or may extend to a location near the hole cup.

According to an embodiment, the guide processor 242 may provide a virtual ball other than a ball to be hit by a user, and may display a guide path in a form in which the virtual ball moves along the guide path.

In the following description, for convenience of description, a ball that is placed on a virtual golf course and will be hit by a user is referred to as a 'first ball,' and a ball that is not actually hit and is used to more effectively display a guide path is referred to as a 'second ball.'

In other words, the guide processor 242 may realize the motion in which the second ball moves along the guide path from the location where the first ball is placed to a hole cup or a location around the hole cup. Accordingly, a user may guess the shape of a green by viewing the motion in which the second ball moves along the green.

When displaying the second ball, the guide processor 242 may display the second ball to have the same shape as the first ball or display the second ball to have a shape different from that of the first ball.

In this case, when moving the second ball along the guide path, the guide processor 242 may move the second ball while changing at least one of the shape and color of the second ball according to the terrain of a green on the guide path. For example, when the second ball moves along the guide path, the shape may be changed by changing the color, transparency, and/or effect (e.g., twinkling or the like) of the second ball according to the difference in the height of the terrain on the guide path. Accordingly, for example, the second ball may be displayed in red when it is located on a terrain higher than a reference height, and may be displayed in blue when it is located on a terrain lower than the reference height. When the location of the second ball is changed according to a change in the terrain, the color of the second ball may be changed in a gradation manner.

In this case, according to an embodiment, the reference height may be the height of a point where the first ball is placed. Alternatively, according to another embodiment, it may be a marker image. In connection with the marker image, a description will be given later.

According to another embodiment, the guide processor 242 may display the guide path as a line.

In connection with this, the guide processor 242 may display the overall guide path from the location of the first ball to a hole cup as a line, but may display only a part of the guide path. For example, the guide processor 242 may display a guide path located between two marker images.

When displaying the guide path as a line as described above, the guide processor 242 may display the guide path while changing at least one of the shape and color of the guide path according to the difference in the height of the terrain of a green.

For example, the guide processor 242 may bend and change the shape of a line according to a change in the curvature of the terrain of the green.

Furthermore, for example, the guide processor 242 may change the color, thickness, transparency, effect (e.g., twinkling) and/or the like of a line representative of the guide path according to the difference in the height of the terrain on the guide path.

For example, a line at the reference height may be displayed in green, a line at a terrain lower than the reference height may be displayed in blue, and a line at a terrain higher than the reference height may be displayed in red. As the difference in altitude from the reference height increases, the color may be changed from green to red or from green to blue in a gradation manner.

Accordingly, in the case where the starting point of a guide path is a reference height, the guide processor 242 changes the color of a line representative of a guide path from green to blue in a gradation manner when, as the distance to a hole cup decreases, the height of the guide path to the hole cup becomes continuously lower than the reference height.

According to another embodiment, the guide processor 242 may display a guide path as a line along with the motion in which the second ball moves along the guide path.

For example, the guide processor 242 may display a guide path as a line, and may display the motion in which the second ball moves on the line.

Furthermore, according to another embodiment, the guide processor 242 may display the motion in which the second ball moves on a line while displaying a guide path as the line, and may display a marker image corresponding to the second ball at least one point forming a part of the line.

The guide processor 242 may display a marker image at a point through which the second ball passes when the second ball moves along a guide path from the location of the first ball toward a hole cup or a location near the hole cup.

In other words, when the second ball moves along a guide path from the location of the first ball toward a hole cup or a location near the hole cup, the guide processor 242 may identify a point where the second ball has been located on the guide path and display a marker image at the identified point.

In this case, the marker image is an image for indicating a point through which the second ball has passed, and the shape of the marker image may be the same as or different from that of the second ball.

For example, when the second ball moves along the guide path, the guide processor 242 may identify a point where the second ball has been located at a predetermined time interval and display a marker image at the point.

Alternatively, for example, when the second ball moves along the guide path, the guide processor 242 may identify a point where the second ball has been located at each predetermined distance interval and display a marker image at the point.

Alternatively, for example, the guide processor 242 may display a marker image at a point identified based on at least a part of a virtual grid on a green and a guide path.

In connection with this, there may be a virtual grid having a predetermined size to represent the terrain of a predetermined area around a hole cup on a green. The virtual grid may be composed of a plurality of lines crossing each other. According to an embodiment, the shape may be determined according to the difference in the height of the terrain.

In other words, the guide processor 242 may identify a point where a guide path and a virtual grid on a green overlap each other and display a marker image at the point. For example, the guide processor 242 may identify an intersection point where a line constituting a part of a virtual grid and crossing a virtual line passes through a guide path and display a marker image at the intersection point.

In addition, for example, when displaying a marker image, the guide processor 242 may process and display the marker image as if the afterimage of the second ball was left as the marker image is displayed at a corresponding point. As the moving speed of the ball varies depending on the terrain, a user may intuitively become aware of the shape of a green by referring to the intervals between the points marked like afterimages.

Meanwhile, the guide processor 242 may also provide a break point when providing a guide path.

The 'break point' is a point indicative of a location that can affect a change in the terrain or the movement of a ball on a guide path, and may be located at one point on a guide path.

According to an embodiment, the guide processor 242 may determine a break point based on a virtual line connecting a hole cup and a ball.

The guide processor 242 may set a straight line connecting a hole cup and the first ball as a 'virtual line,' and may determine the most distant one of the points on a guide path among the points located perpendicular to the virtual line to be a break point.

In connection with this, FIG. 3 is a diagram illustrating an apparatus for providing terrain information on a green according to an embodiment, which shows a hole cup H, a first ball B, and a guide path 310 on a green.

The guide processor 242 may determine the point, selected from among the points located perpendicular to the virtual line 320 connecting the hole cup H and the first ball B and located farthest from the virtual line 320 among the points on the guide path 310, to be a break point.

In other words, as shown in FIG. 3, a point 300 selected from among the points located perpendicular to the virtual line 320 and located farthest from the virtual line 320 may be determined to be a break point. Accordingly, a vertical distance 350 from the point 300 determined to be the break point to the virtual line 320 is the longest of the vertical distances from another point perpendicular to the virtual line as a point on the guide path to the virtual line 320. For example, the vertical distance 350 is longer than a distance 360.

According to another embodiment, the guide processor 242 may determine a break point based on the differences in the height of the terrain between a hole cup and a ball.

The guide processor 242 may allow the second ball to move according to the difference in the height of the terrain when the second ball moves along a guide path from the location of the first ball toward a hole cup or a location near the hole cup, and may determine the point when the second ball moves from a low terrain to a high terrain or from a high terrain to a low terrain to be a break point.

In this case, the guide path from the location of the first ball to the hole cup or the location near the hole cup may have an inflection point depending on the differences in the height of the terrain. The guide processor 242 may determine the inflection point to be a break point.

In connection with this, FIG. 4 is a diagram illustrating an apparatus for providing terrain information on a green according to an embodiment, which shows a hole cup H, a first ball B, and a guide path 410 on a green.

Referring to FIG. 4, the guide path is connected from the location of the first ball 410 to the hole cup H as it moves from a high terrain to a low terrain, and the guide processor 242 may determine the inflection point 400 of the guide path 410 to be a break point.

Meanwhile, according to another embodiment, when a plurality of break points are identified on a guide path, the guide processor 242 may select at least one of the plurality of break points and determine the selected break point to be a break point to be displayed to a user.

For example, when determining a break point based on a virtual line, there may be a plurality of break points because a plurality of points having the same distance to the virtual line are present on a guide path.

Alternatively, for example, when determining a break point based on the differences in the height, there may be a plurality of break points as a plurality of points corresponding to an inflection point are present on a guide path.

In this case, the guide processor 242 may select an arbitrary break point from among the plurality of break points.

Alternatively, the guide processor 242 may select at least one of the plurality of break points based on a predetermined condition.

For example, the guide processor 242 may select a point closest to the location of the first ball from among the plurality of break points as a break point.

In connection with this, FIG. 5 is a diagram illustrating an apparatus for providing terrain information on a green according to an embodiment, which shows a hole cup H, a first ball B, and a guide path 510 on a green.

As shown in FIG. 5, there are three points having the same distance to the virtual line, so that a plurality of break points 500, 501, and 502 can be present.

In this case, the guide processor 242 may display all the break points 500, 501, and 502 to a user.

Alternatively, the guide processor 242 may select the break point 500 at a location closest to the location of the first ball B from among the break points 500, 501, and 502 and display the selected break point 500 to a user.

Alternatively, the guide processor 242 may select one point 500 located on the right side of a line connecting the first ball B and the hole cup H and one point 501 located on the left side of the connecting line based on the connecting line and display them to a user. In this case, the guide processor 242 may display the point 502 located on the right side of the connecting line and the inflection point 501 located on the left side of the connecting line to a user.

As described above, the guide path and the break point are determined, visualized, and projected onto the screen 30 through the image output unit 230, so that the guide processor 242 allows a user to determine the state of terrain before performing putting on a green.

Figure 6:
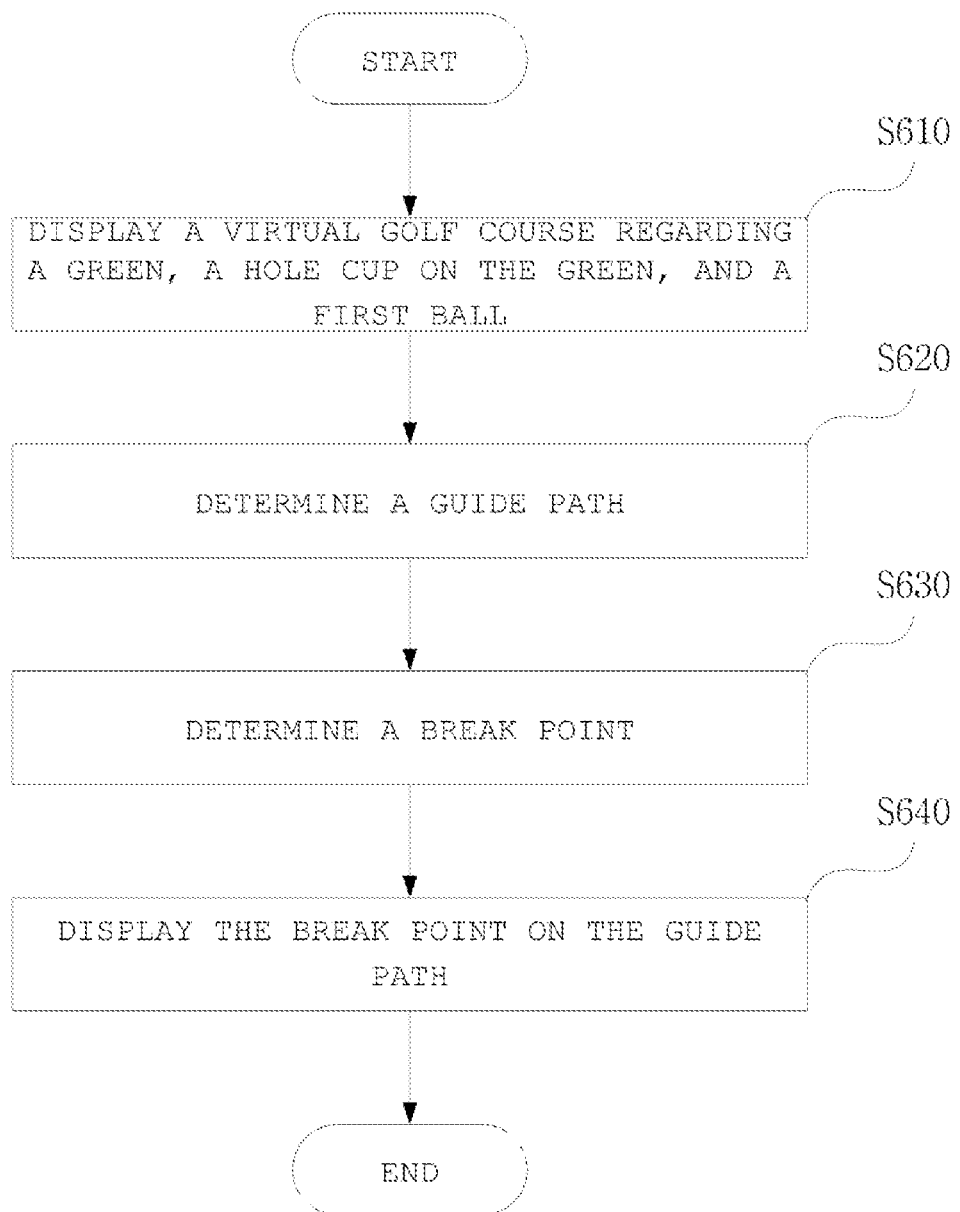
FIGS. 6 and 7 are flowcharts illustrating a method for providing terrain information on a green according to an embodiment disclosed herein.
Figure 7:
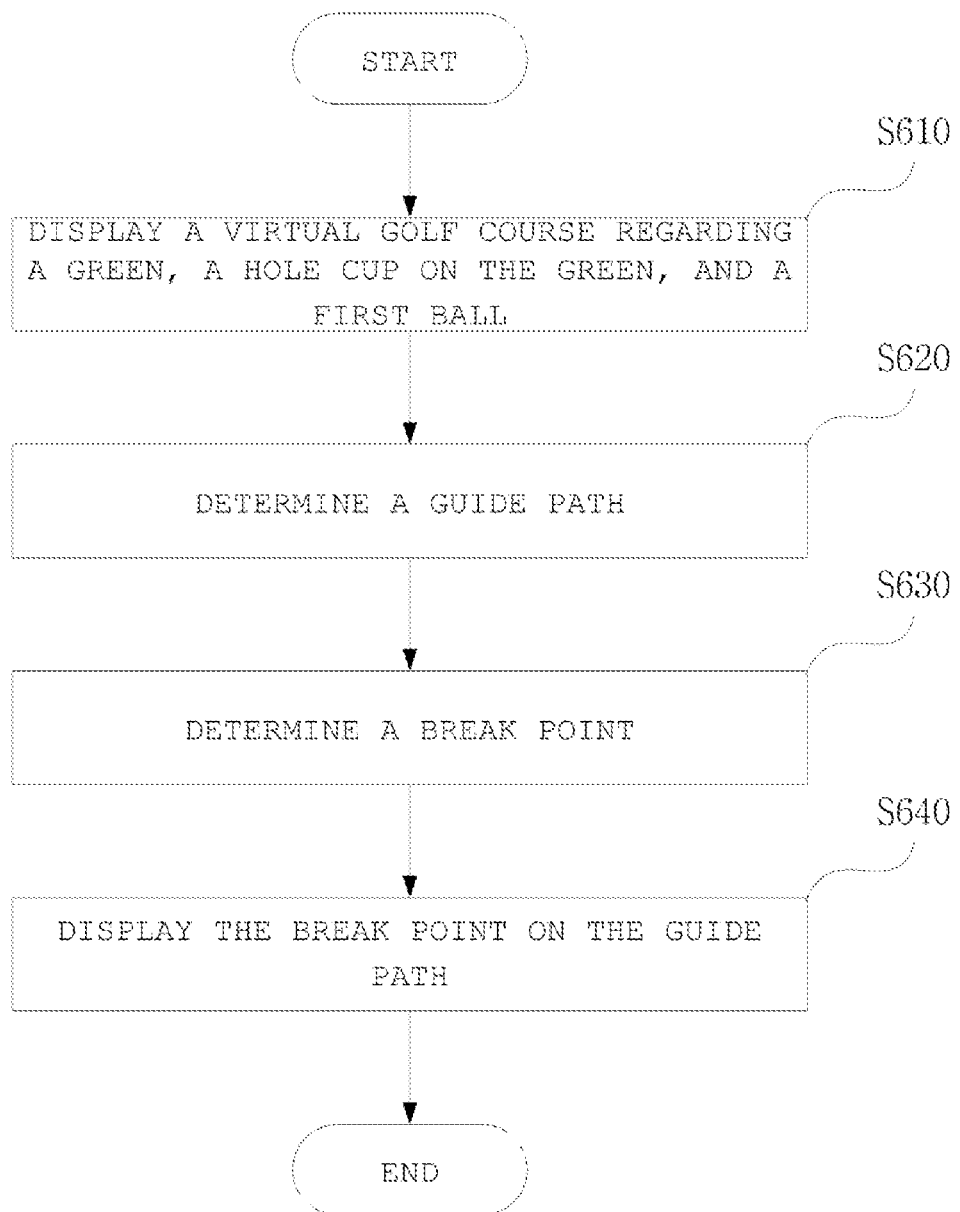

Meanwhile, FIGS. 6 and 7 are flowcharts illustrating a method for providing terrain information on a green according to an embodiment. The method for providing terrain information on a green according to the embodiment shown in FIGS. 6 and 7 includes steps that are processed in a time-series manner by the apparatus 100 for providing terrain information on a green described through FIGS. 1 to 5. Accordingly, the descriptions that are omitted below but have been given above in conjunction with the apparatus 100 for providing terrain information on a green shown in FIGS. 1 to 5 may also be applied to the method for providing terrain information on a green according to the embodiment shown in FIGS. 6 and 7.

Figure 8:
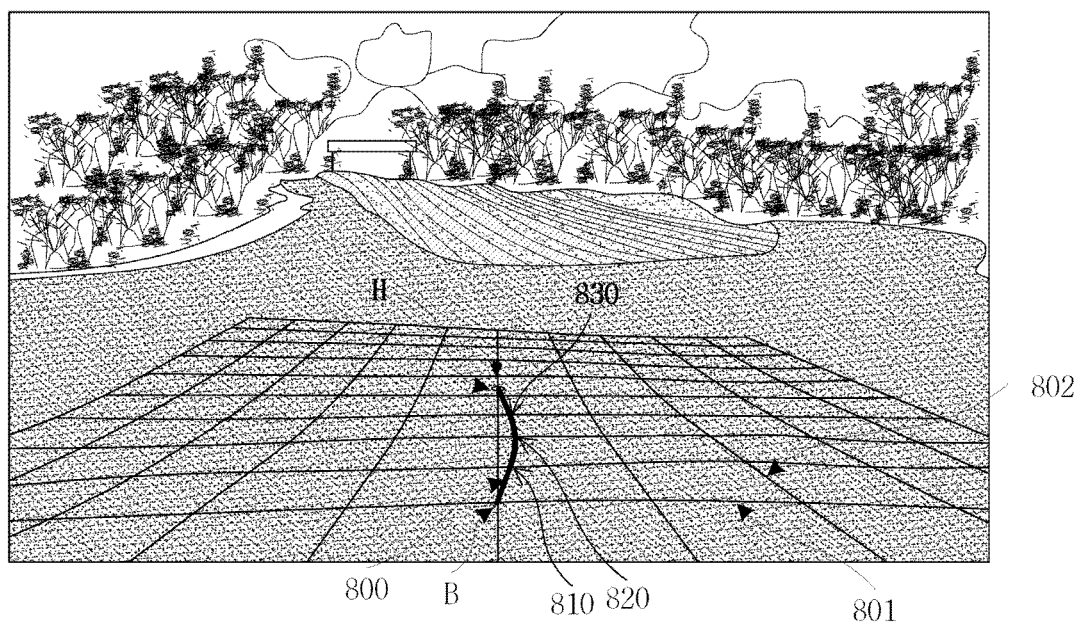
FIGS. 8 to 10 are exemplary diagrams illustrating the method for providing terrain information on a green according to the embodiment disclosed herein.
Figure 9:
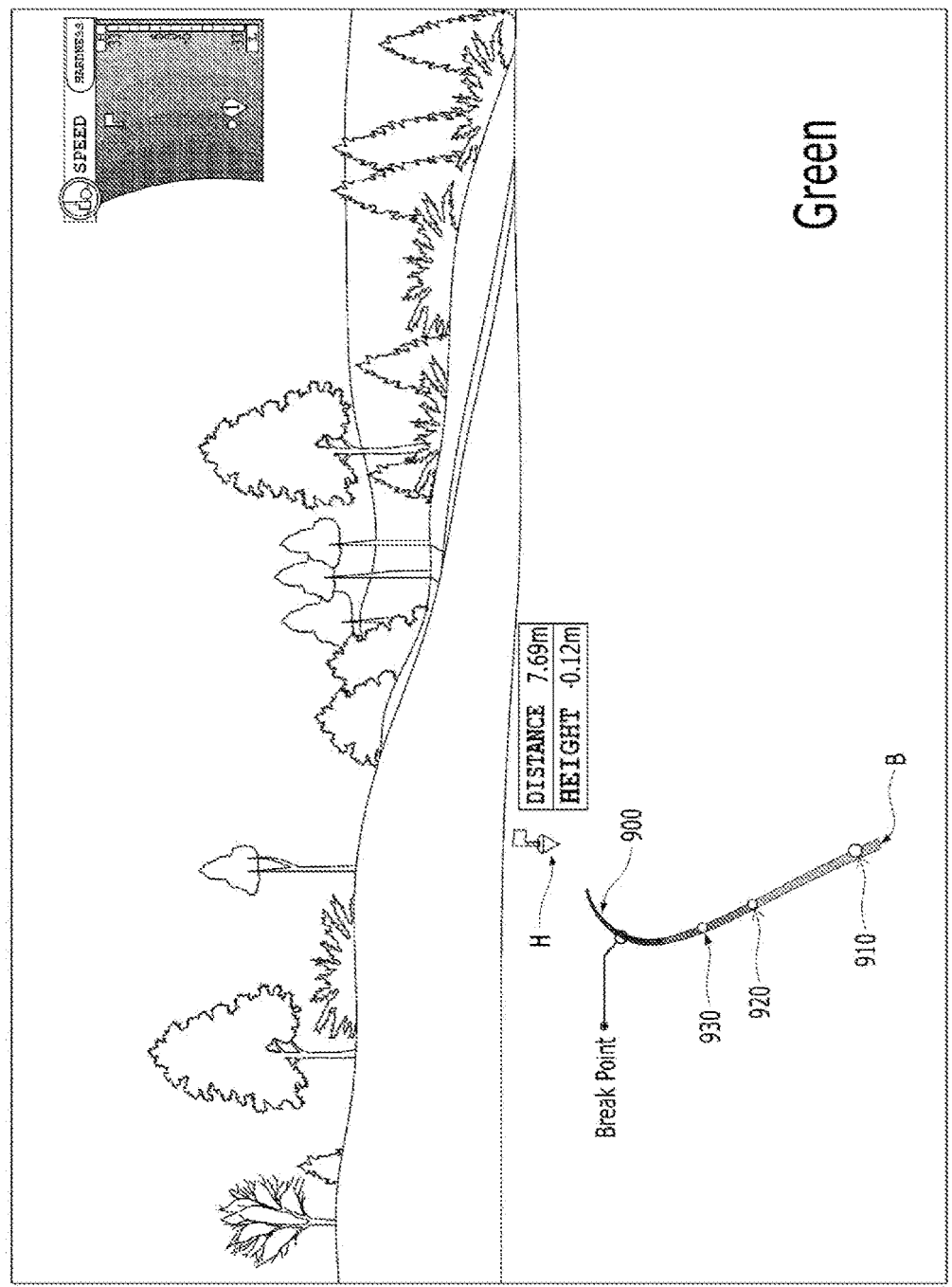
Figure 10:
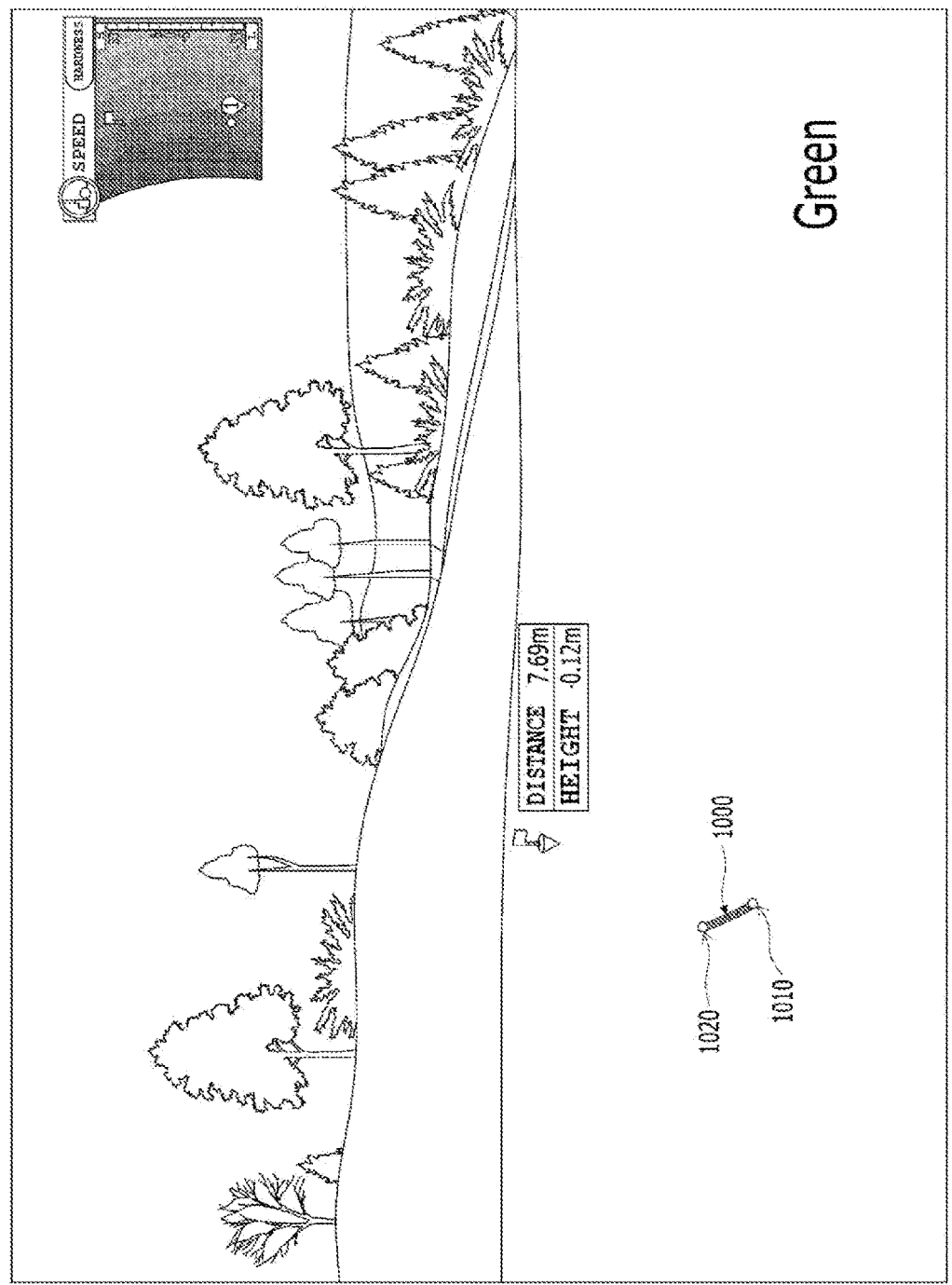

In addition, FIGS. 6 to 7 will be described below with reference to FIGS. 8 to 10. FIGS. 8 to 10 are intended to describe the method for providing terrain information on a green. More specifically, FIG. 8 is intended to describe an embodiment of providing a marker image on a guide path, and FIGS. 9 and 10 show a state in which a simulation image on which a guide path is marked is displayed on a screen.

The apparatus 100 for providing terrain information on a green may simulate and display a virtual golf course on which the locations of a green, a hole cup on the green, and a first ball are marked in step S610.

The apparatus 100 for providing terrain information on a green may determine a guide path in step S620.

Once the apparatus 100 for providing terrain information on a green has determined the guide path, it may display the guide path, or may display the guide path after a break point has been determined through step S630.

In connection with this, when displaying the guide path, the apparatus 100 for providing terrain information on a green may display the guide path after changing at least one of the shape and color of the guide path according to a change in the terrain on the guide path.

Furthermore, the apparatus 100 for providing terrain information on a green may display the motion in which a second ball moves from the first ball toward the hole cup along the guide path. In this case, the apparatus 100 for providing terrain information on a green may display a marker image corresponding to the second ball at a point on the guide path.

Furthermore, the apparatus 100 for providing terrain information on a green may move the second ball toward the hole cup along the guide path, and may display a marker image on a point through which the second ball has passed.

Furthermore, the apparatus 100 for providing terrain information on a green may move the second ball toward the hole cup along the guide path, and may identify a point where the second ball has been located at a predetermined time interval and display a marker image at the identified point.

Alternatively, the apparatus 100 for providing terrain information on a green may display a marker image at a point identified based on at least a part of a virtual grid on the green and the guide path.

In connection with this, as shown in FIG. 8, there may be a virtual grid having a predetermined size to represent the terrain of a predetermined area around the hole cup H on the green. The grid may be displayed in the form in which a plurality of lines 801 and 802 cross each other. In this case, when the hole cup H is viewed from the first ball B, there are a plurality of lateral lines 801 and vertical lines 802 crossing the lateral lines 801. The apparatus 100 for providing terrain information on a green may identify points 810, 820, and 830 where the guide path 800 and the lateral lines 801 overlap each other and display marker images at the identified points 810, 820, and 830.

Meanwhile, FIG. 8 shows a green grid 801 and 802 for convenience of description. When the apparatus 100 for providing terrain information on a green provides a guide path and a marker image, it may determine a marker image based on a grid of a green and a guide path without the green grid 801 and 802 and provide a guide path 800 and the marker image to a user accordingly.

Meanwhile, the apparatus 100 for providing terrain information on a green may determine a break point in step S630.

For example, the apparatus 100 for providing terrain information on a green may determine a break point based on a virtual line connecting the hole cup and the first ball.

Alternatively, for example, the apparatus 100 for providing terrain information on a green may determine a break point based on the difference in the height of the terrain on a guide path.

In this case, referring to FIG. 7, when there is one break point in step S710, the process may move to step S640. In contrast, when it is determined that there are a plurality of break points in step S710, it may be determined whether to display at least one of the plurality of break points in step S720.

In other words, the apparatus 100 for providing terrain information on a green may determine whether to display all the plurality of break points in step S720. When it is determined that all the break points will be displayed, the process may move to step S640.

However, the apparatus 100 for providing terrain information on a green may select at least one of the plurality of break points based on a predetermined condition in step S730. For example, the apparatus 100 for providing terrain information on a green may select a break point closest to a user, may select a break point closest to the hole cup, may select a break point where the terrain is concave, may select a break point located above or below a line connecting the hole cup and the first ball, or may select a break point located on the left or right side of the line connecting the hole cup and the first ball.

To this end, the apparatus 100 for providing terrain information on a green may receive a setting of a break point from the user before or during a round. The user may set whether to display all the plurality of break points or at least one of the plurality of break points.

Thereafter, the apparatus 100 for providing terrain information on a green may move to step S640, and may display the break point on the guide path in step S640.

Accordingly, as shown in FIG. 9, the user may check a guide path 900, on which the break point is marked, through the screen 30.

In other words, the apparatus 100 for providing terrain information on a green may provide the motion in which a second ball 930 moves along the guide path 900 while providing the guide path 900 extending from the location of the first ball B to the hole cup H or a location near the hole cup H.

In addition, when the second ball moves along the guide path, the apparatus 100 for providing terrain information on a green may identify points where the second ball has been located at predetermined time intervals and display marker images 910 and 920 at the respective points. Accordingly, the user may determine the rolling speed of the second ball by referring to the marker images 910 and 920. For example, when the distance between the marker images is wide, it may be inferred that the corresponding terrain has a green speed or slope that allows the ball to roll rapidly. Accordingly, the user may set up a putting strategy by inferring the state of the terrain by reference to the marker images.

In addition, the user may check a guide path such as that shown in FIG. 10 through the screen 30.

The apparatus 100 for providing terrain information on a green may provide a guide path 1000 connecting between the marker images.

In other words, when the second ball moves along the guide path, the apparatus 100 for providing terrain information on a green may identify the points where the second ball has been located and display marker images 1010 and 1020 at the points. The apparatus 100 for providing terrain information on a green may provide the motion in which the color of the guide path changes according to a change in the height from the one marker image 1010 to the subsequent marker image 1020. Accordingly, there may be provided the guide path 1000 located between both the marker images 1010 and 1020. Therefore, the user may set up a putting strategy by inferring the state of the terrain by reference to the marker images 1010 and 1020.

The method for providing terrain information on a green described above may also be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

The method for providing terrain information on a green described above may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

The method for providing terrain information on a green described above may be implemented in such a manner that the above-described computer program is executed by a computing device. The computing device may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing device. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit (s)' may be coupled to a smaller number of components and 'unit(s)' or divided into a larger number of components and 'unit(s).'

In addition, components and 'unit(s)' may be implemented to run one or more CPUs in a device or secure multimedia card. The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. An apparatus for providing terrain information on a green, the apparatus comprising:
a simulation processor configured to display a virtual golf course image regarding a green, a hole cup on the green, and a first ball; and
a guide processor configured to display a guide path between the hole cup and the first ball to provide terrain information on the green,
wherein the guide processor displays a break point on the guide path, and selects a point that is farthest from a virtual line connecting the hole cup and the first ball as the break point.

2. The apparatus of claim 1, wherein the guide processor displays the break point on the guide path, and, when identifying a plurality of break points on the guide path, displays at least one of the plurality of break points based on a predetermined condition.

3. The apparatus of claim 1, wherein the guide processor displays the guide path, and displays the guide path after changing at least one of a shape and color of the guide path according to a change in terrain on the guide path.

4. An apparatus for providing terrain information on a green, the apparatus comprising:
a simulation processor configured to display a virtual golf course image regarding a green, a hole cup on the green, and a first ball; and
a guide processor configured to display a guide path between the hole cup and the first ball to provide terrain information on the green,
wherein the guide processor is configured to display a second ball moving from the first ball toward the hole cup along the guide path, identify, at predetermined time intervals, a point where the second ball was located, and display a marker image at the identified point.

5. The apparatus of claim 4, wherein the guide processor is configured to display a plurality of marker images, and to provide a motion in which a color of the guide path changes according to a change in height from one marker image to a subsequent marker image.

6. A method for providing terrain information on a green, the method being performed by an apparatus for providing terrain information on a green, the method comprising:
displaying a virtual golf course image regarding a green, a hole cup on the green, and a first ball; and
displaying a guide path between the hole cup and the first ball to provide terrain information on the green,
wherein displaying the guide path further comprises displaying a break point on the guide path and selecting a point that is farthest from a virtual line connecting the hole cup and the first ball as the break point.

7. The method of claim 6, wherein displaying the guide path further comprises displaying the break point on the guide path and, when identifying a plurality of break points on the guide path, displaying at least one of the plurality of break points based on a predetermined condition.

8. The method of claim 6, wherein displaying the guide path further comprises displaying the guide path and displaying the guide path after changing at least one of a shape and color of the guide path according to a change in terrain on the guide path.

9. A method for providing terrain information on a green, the method being performed by an apparatus for providing terrain information on a green, the method comprising:
  displaying a virtual golf course image regarding a green, a hole cup on the green, and a first ball; and
  displaying a guide path between the hole cup and the first ball to provide terrain information on the green,
  wherein displaying the guide path further comprises displaying a second ball moving from the first ball toward the hole cup along the guide path, identifying, at predetermined time intervals, a point where the second ball was located, and displaying marker images at the identified point.

10. The method of claim 9, wherein displaying the guide path further comprises displaying a plurality of marker images, and providing a motion in which a color of the guide path changes according to a change in height from one marker image to a subsequent marker image.

\* \* \* \* \*